(12) United States Patent
Kobayashi et al.

(10) Patent No.: US 7,581,721 B2
(45) Date of Patent: Sep. 1, 2009

(54) CYLINDRICAL VIBRATION ISOLATING DEVICE

(75) Inventors: Masahide Kobayashi, Fujimino (JP); Tetsuya Miyahara, Wako (JP)

(73) Assignees: Yamashita Rubber Kabushiki Kaisha, Fujimino-shi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/972,247

(22) Filed: Jan. 10, 2008

(65) Prior Publication Data
US 2008/0169591 A1 Jul. 17, 2008

(30) Foreign Application Priority Data
Jan. 11, 2007 (JP) .............................. 2007-003753

(51) Int. Cl.
*F16F 13/00* (2006.01)
(52) U.S. Cl. ............................... 267/141.2; 267/140.12
(58) Field of Classification Search . 267/140.12–141.7, 267/279–283, 292
See application file for complete search history.

(56) References Cited

U.S. PATENT DOCUMENTS

| | | | | |
|---|---|---|---|---|
| 4,183,496 A | * | 1/1980 | Brock et al. ................. | 248/638 |
| 4,840,359 A | * | 6/1989 | Hamaekers et al. .... | 267/140.12 |
| 4,919,401 A | * | 4/1990 | Yano ...................... | 267/140.12 |
| 5,042,785 A | * | 8/1991 | LeFol et al. ............ | 267/140.12 |
| 5,060,918 A | * | 10/1991 | Kanda .................... | 267/140.12 |
| 5,152,510 A | * | 10/1992 | Komabashiri ............ | 267/141.2 |
| 5,944,297 A | * | 8/1999 | Flower et al. ................ | 248/638 |
| 6,241,225 B1 | * | 6/2001 | Krause ........................ | 267/292 |
| 6,378,853 B1 | * | 4/2002 | Kammel et al. .......... | 267/141.2 |
| 6,755,404 B1 | * | 6/2004 | Lefferts et al. .............. | 267/281 |
| 2003/0111780 A1 | * | 6/2003 | Ogawa et al. .......... | 267/140.12 |

FOREIGN PATENT DOCUMENTS

JP 1-126447 5/1989

* cited by examiner

*Primary Examiner*—Christopher P Schwartz
(74) *Attorney, Agent, or Firm*—Rankin, Hill & Clark LLP

(57) ABSTRACT

To decrease dimensions in the axial direction by dispensing with a stopper while making the control of a value of spring constant easy in the axial direction of a sub-frame mount and in the direction meeting at right angles therewith, an inner cylinder 3 is arranged inside of an outer cylinder which is formed in a substantially cylindrical shape by having a pair of half bodies arranged in an opposed relationship, and a vibration isolating rubber is adapted to connect between the outer cylinder and the inner cylinder. Slits are formed on side walls of the vibration isolating rubber along slits dividing the outer cylinder. Projecting portions are provided on the inner peripheral wall of the outer cylinder to project toward the inner cylinder. The outer cylinder and tips are formed concentrically and a radius of curvature R1 of the inner peripheral wall of the outer cylinder is smaller than a radius of curvature R3 of the opposed outer peripheral wall of the inner cylinder. When the slits are narrowed to reduce the diameter of the outer cylinder at the time of mounting the sub-frame mount I on a sub-frame, the vibration isolating rubber is sent from the side of the slits into intermediate portions so as to form an enclosed portion of large filling amount.

4 Claims, 8 Drawing Sheets

A

B

CYLINDRICAL VIBRATION ISOLATING DEVICE

BACKGROUND OF THE INVENTION

1. Field of the Invention

The present invention relates to a cylindrical vibration isolating device suitable for a sub-frame mount or the like.

2. Description of the Related Art

As an example of cylindrical vibration isolating devices there is known a sub-frame mount. This sub-frame mount has an outer cylinder which is split right and left by a slit, and, when being mounted on a sub-frame, the slit is narrowed to reduce the diameter of the outer cylinder so as to compress an elastic body between an inner cylinder and the outer cylinder. There is also known such a sub-frame mount that projecting portions which project in the radial direction each from the outer cylinder to the inner cylinder and from the inner cylinder to the outer cylinder are provided spaced apart in the axial direction of the inner cylinder. When being mounted, the elastic body is compressed by each of tips of the projecting portions to increase the spring constant in the direction orthogonal to the inner cylinder axis while the spring constant in the axial direction is increased by the shearing action of the elastic body interposed between the couple of projecting portions.

Patent reference 1: Japanese patent laid-open publication No. H01-126447.

Since the axial direction of the inner cylinder corresponds to the input direction of the principal load, the spring constant in this direction is required to be increased, and the spring constant in this direction is influenced by the volume of the elastic body between the couple of projecting portions spaced apart in the axial direction of the inner cylinder. For increasing this volume the space between the tips of the projecting portions needs to be narrowed, but, if it is narrowed too much, the spring constant in the axially perpendicular direction is increased excessively. Accordingly, while this space must be increased to a certain extent, in that case, the volume of the elastic body between the projecting portions is decreased so that the spring constant in the axial direction is decreased below the requested level. Then, since the displacement in the axial direction is not able to be controlled only by the spring in this part, it is necessary to control the displacement by having a stopper 4A, as shown in FIG. 3 in phantom line, projected axially outwardly from the surface of the elastic body. However, since such stopper 4A increases the size in the axial direction of the device, there may be cases where the layout becomes difficult, depending on the models.

Further, when the stopper 4A exists, the stopper 4A itself has a large value of spring constant, and, when the stopper 4A is in contact with an engine side at the time of idling operation, the micro-vibration may be transmitted to the vehicle body side, so that it is required to isolate such vibration.

The present invention therefore aims to provide the vibration isolating device capable of forming such a large spring constant that the above mentioned stopper can be dispensed with, also capable of increasing the degree of freedom to control the ratio between the spring constant in the axial direction and the spring in the axially perpendicular direction, and capable of more improving the vibration isolating performance.

SUMMARY OF THE INVENTION

To solve the above mentioned problem, a cylindrical vibration isolating device according to the first aspect of the present invention comprises an inner cylinder and an outer cylinder being arranged inwardly and outwardly and connected with each other through an elastic body, the outer cylinder being split previously in a circumferential direction to reduce a diameter thereof at the time of being mounted, a pair of projecting portions being provided spaced apart in the axial direction of the inner cylinder and projecting from one side to the other side between the inner and the outer cylinders while having a predetermined space left, and the elastic body being compressed by narrowing the predetermined space at the time of reducing the diameter of the outer cylinder, wherein in a cross section orthogonal to an axis of the inner cylinder, an inner peripheral wall of the outer cylinder is formed smaller in radius of curvature than an opposed outer peripheral wall of the inner cylinder such that a space between the inner and outer cylinders is gradually narrowed toward end portions in a circumferential direction of the outer cylinder.

According to the second aspect of the present invention, the outer cylinder comprises half bodies split in two positions opposite to each other across the axis of the inner cylinder.

According to the third aspect of the present invention, the projecting portions are integrally formed with the outer cylinder.

According to the invention as defined in the first aspect, since in a cross section orthogonal to the axis of the inner cylinder, the inner peripheral wall of the outer cylinder is formed smaller in a radius of curvature than the opposed outer peripheral wall of the inner cylinder, the space between the inner and the outer cylinders is gradually narrowed toward the end portions in a circumferential direction of the outer cylinder. Therefore, when the outer cylinder the diameter of which is in an enlarged state is reduced in diameter, the compressed elastic body is hard to escape from the both ends in the circumferential direction of the outer cylinder. Then, since the elastic body is compressed by the tips of the axially spaced projecting portions, the escape in the axial direction is diminished. Therefore, the compressed filling amount of the elastic body between the pair of projecting portions is increased so as to make the spring constant larger in the axial direction, so that a stopper axially projecting from the surface of the elastic body can be dispensed with, thereby making the device compact and light by preventing the axial expansion in size of the device due to the provision of the stopper. Hence, the device is able to be installed in the axial dimension limited space, thereby increasing the freedom of layout. Also, the spring constant in the axial direction the spring in the direction orthogonal to the axis each are able to be comparatively freely set, thereby to increase the degree of freedom of the spring constant ratio control in the axial direction and in the direction orthogonal to the axis.

In addition, since the stopper as seen in the prior art is not required, the vibration isolating performance can be further improved without transmission of the micro-vibration to the vehicle body side through the stopper when in the idling operation.

According to the invention as defined in the second aspect, the outer cylinder comprises half bodies split in two positions opposite to each other across the axis of the inner cylinder. Therefore, given that the axial direction is "Z", the direction of a straight line connecting the opposite split portions is "Y", and the direction orthogonal to these "Y" and "Z" is "X", the spring constant in each of the directions "X", "Y" and "Z" of three orthogonal axes can be easily set by having the pair of half bodies of the outer cylinder arranged in an opposed relationship in the direction of "X".

According to the invention as defined in the third aspect, since the projecting portions are integrally formed with the outer cylinder of split structure, they can be formed by a split mold for forming an inner wall side and an outer wall side of the outer cylinder, whereby the forming can be easily carried out.

DETAILED DESCRIPTION OF THE PREFERRED EMBODIMENT

Figure 1:
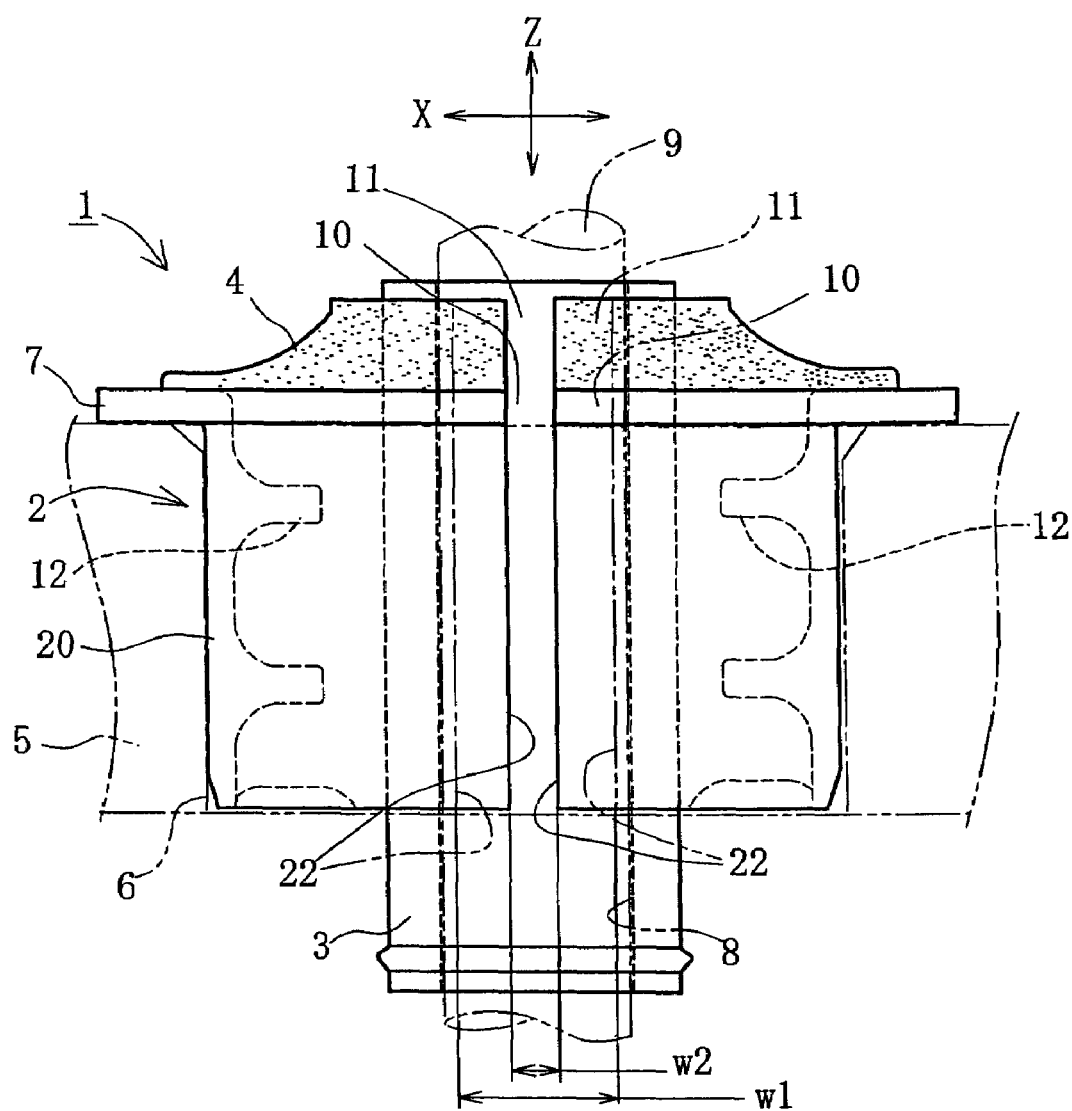
FIG. 1 is a side view of a sub-frame mount according to the first embodiment of the present invention.
Figure 2:
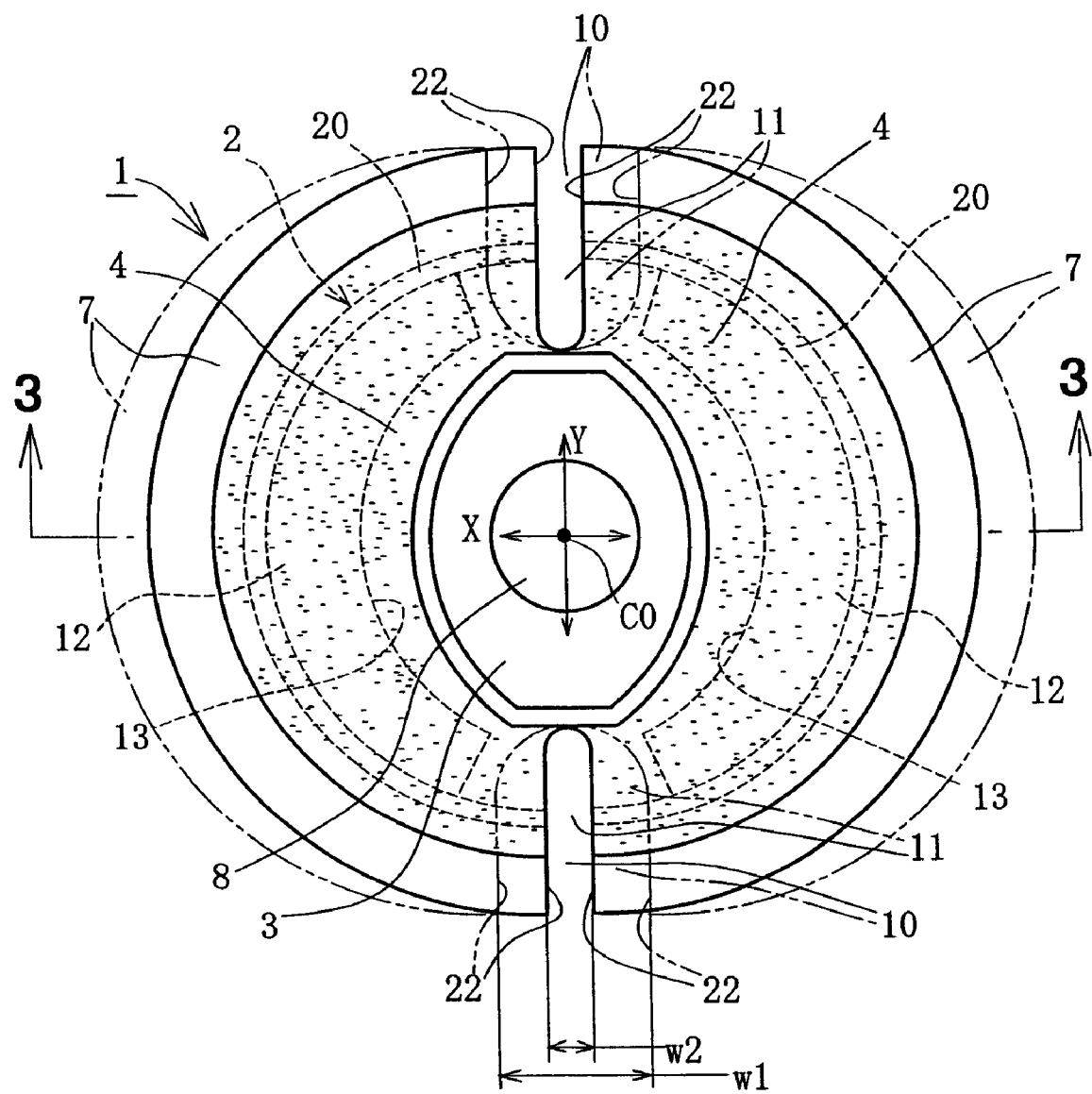
FIG. 2 is a plan view of the sub-frame mount.

Hereinafter, the embodiment embodied in a sub-frame mount will be explained with reference to the accompanying drawings. FIG. 1 is a side view of a sub-frame. FIG. 2 is a plan view thereof. Referring now to these drawings, the sub-frame mount 1 comprises an outer cylinder 2, an inner cylinder 3 substantially concentrically arranged within the outer cylinder 2, and a vibration isolating rubber 4 connecting between these inner and outer cylinders. The vibration isolating rubber 4 is a principal portion for absorbing the vibration and formed of a conventional rubber as an example of an elastic body. The outer cylinder 2 and the inner cylinder 3 are formed by a proper method such as casting or the like, using a proper material consisting of metal or resin.

The outer cylinder 2 is installed by being pressed into a mounting hole 6 provided on a sub-frame 5 on a vehicle body side. The reference character 7 is a flange provided on an end of the outer cylinder 2 to be fitted on a periphery of the mounting hole 6. In the inner cylinder 3 there is provided an axially extending through hole 8 for inserting a mounting shaft 9 such as a bolt or the like through which the inner cylinder 3 is connected with an engine side (not shown).

The outer cylinder 2 is formed with half bodies 20 (see FIG. 5 and FIG. 6 as will be explained hereunder) split into two pieces in a diametrical direction, which are connected and united though the vibration isolating rubber 4. As shown in FIG. 2, the split portions are provided with slits 10 to be narrowed at the time of being mounted. The slit 10 in FIG. 2 is in a narrowed state (the same as in FIG. 1, FIG. 3 and FIG. 4). The outer cylinder 2 has a substantially elliptical shape in a plan view in such a state that the pair of half bodies 20 is opposed to each other across the slits 10 which are not narrowed but open. The contour of the flange 7 shown in phantom line in the drawing corresponds to an external configuration in the above mentioned state. This state is referred to as "enlarged diameter state", and a radius of an imaginary circle that both of the half bodies 20 are inscribed is referred to as "enlarged radius".

On the lateral sides of the vibration rubber 4 there are also formed slits 11 which are connected in series with the slits 10 and recessed toward the inner cylinder 3. In the state before being mounted on the sub-frame 5, a predetermined comparatively large initial space w1 is defined as shown in phantom line. The outer cylinder 2 is able to be pressed into and installed in the mounting hole 6 of the sub-frame 5 by narrowing the initial space w1 while reducing the enlarged diameter. The narrowed space after being mounted is represented by w2. Shown in solid line in FIG. 1 and FIG. 2 is the reduced diameter state.

Three axes which meet at right angles are represented by X, Y and Z. As shown in FIG. 1, the Z axis extends in parallel to the axis of the inner cylinder 3. Also, as shown in FIG. 2, the slits 10 and 11 each are arranged in an opposed relationship across the center C0 (located on the axis Z) of the inner cylinder 3. The axis connecting between the opposed slits 10 and passing C0 is represented by Y, and the axis meeting at right angles with the axis Y and passing C0 is represented by X. In the explanation hereunder, the directions extending in parallel to each of the axes X, Y and Z may be simply referred to as X, Y and Z directions. Moreover, the state as shown in FIG. 1 and FIG. 2 corresponds to the state in use, so that the direction of Z is an upward and downward direction, the direction of X is a forward and backward direction, and the direction of Y is a right and left direction.

Figure 3:
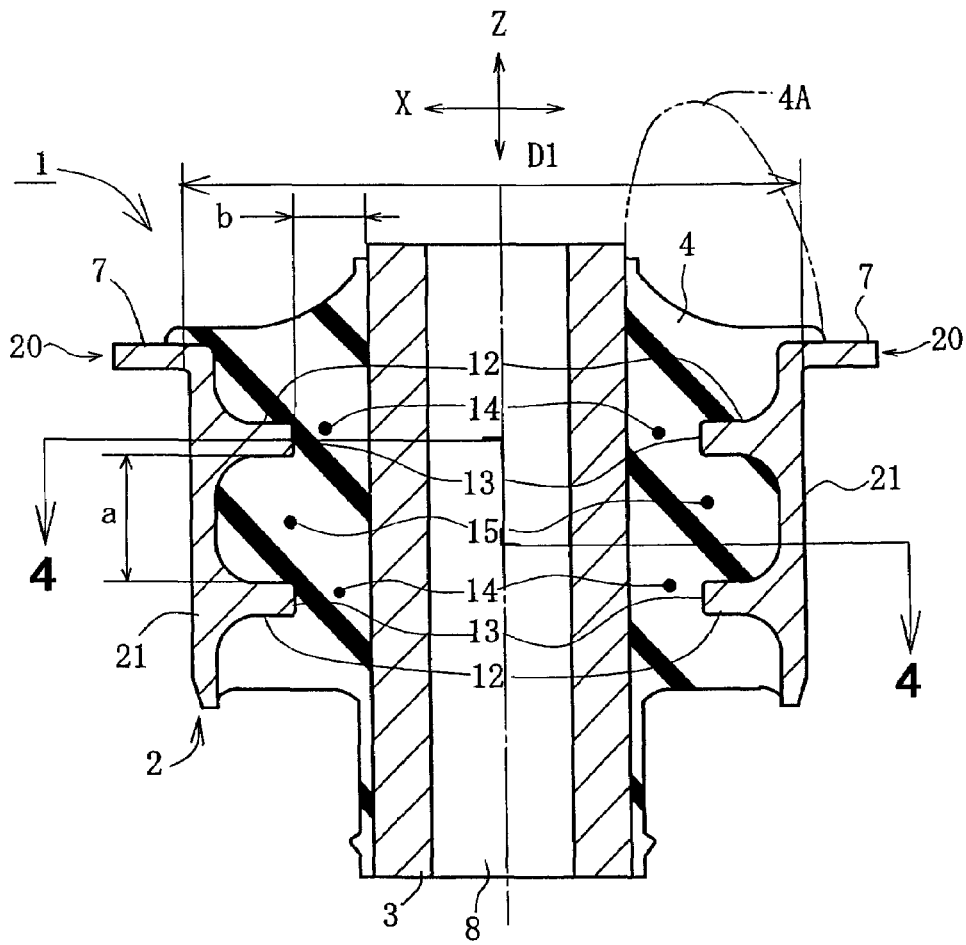
FIG. 3 is a cross sectional view taken along line 3-3 of FIG. 2.

FIG. 3 is a cross sectional view taken along line 3-3 of FIG. 2, wherein projecting portions 12 projecting in the central direction are formed integral with the inner wall of the outer cylinder 2. The projecting portions 12 are in the form of a pair of arc-shaped walls provided with a predetermined space "a" in the direction of Z corresponding to the central axis of the inner cylinder 3, that is, in the upward and downward direction of the drawing. Each pair of projections 12 projects inwardly in the radial direction in an opposed relationship, and a space "b" is formed between each of tips 13 and the outer peripheral wall of the inner cylinder 3. Between each of the tips 13 of the projecting portions 12 and the opposed outer peripheral wall of the inner cylinder 3 there are formed compressed portions 14 in such a manner that a portion of the vibration isolating rubber 4 is compressed by each of the tips 13 at the time of being mounted.

Between the pair of projecting portions 12 in the upward and downward direction in the drawing there is provided an enclosed portion 15 filled with a portion of the vibration isolating rubber 4. The vibration isolating rubber 4 functions as a rubber spring having a spring constant which is determined of itself by the volume, a degree of compression or the like. The compressed portion 14 and the enclosed portion 15 are different in the compression amount and the volume of the vibration isolating rubber so as to generate the spring of different spring constants.

The compressed portion 14 is mainly involved in the spring constant in the direction of the X axis, that is, the magnitude of the spring constant in the direction of X. Then, while the spring constant in the direction of the Y axis of the compressed portion 14, that is, the magnitude of the spring constant in the direction of Y becomes remarkably small due to the existence of the slits 11, the compressed portion 14 is also involved in this spring to a certain extent. The enclosed portion 15 is involved in the spring constant in the direction of the Z axis, that is, the magnitude of the spring constant in the direction of Z. The space "a" between the upper and lower projecting portions 12 exerts an influence upon the volume of the vibration isolating rubber of the enclosed portion 15 and is set in accordance with the required magnitude of the spring constant.

Figure 4:
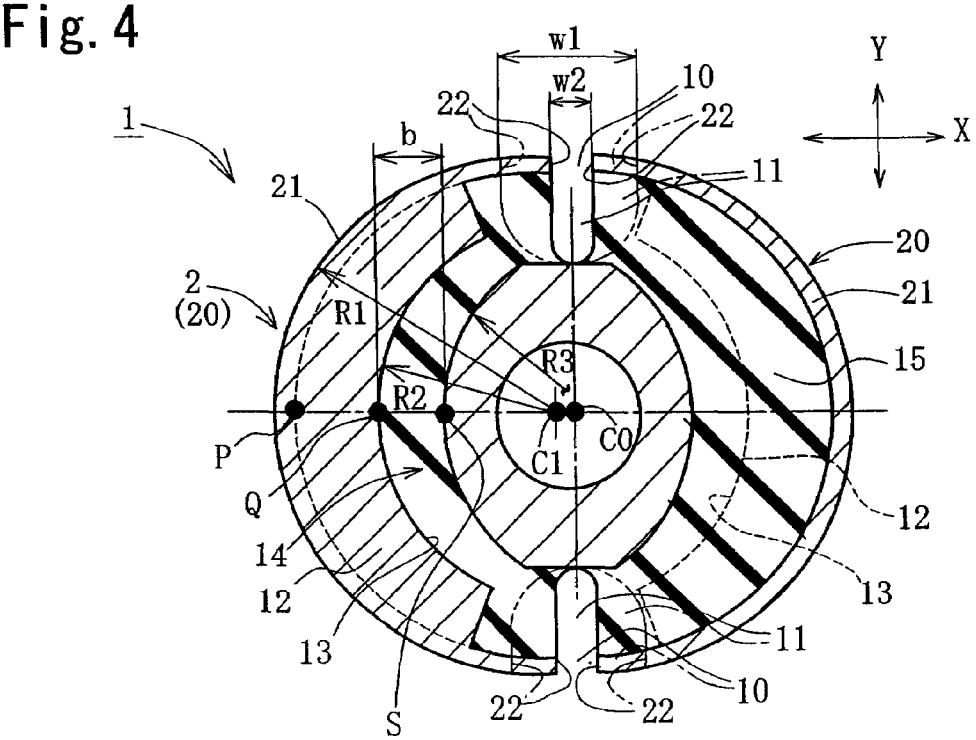
FIG. 4 is a cross sectional view taken along line 4-4 of FIG. 3.

FIG. 4 is a cross sectional view taken along line 4-4 of FIG. 3. The outer peripheral wall of the inner cylinder 3 is formed in a substantially elliptical shape which corresponds to the shape cutting straight each end of the major axis of an ellipse. The major axis extends in parallel with the Y axis toward the slits 10 and 11, while the minor axis extends in parallel with the X axis. In the drawing, the slits 10 and 11 are shown in the narrowed mounted state (the state after being mounted) in which the diameter of the outer cylinder is reduced.

In the left half of the outer cylinder 2 in the drawing, the outer cylinder 2 and the projecting portion 12 are formed in the concentric arc shape, and the center C1 of each of the radii of curvature R1 and R2 is offset a little from the center C0 of the inner cylinder 3 in the direction of X. Each of the radii R1 and R2 is smaller than the radius of curvature R3 with respect to the opposed portion of the inner cylinder 3, respectively. The right half in the drawing of the outer cylinder 2 is formed similarly. Herein, the outer cylinder 2, the projecting portion 12 and the outer peripheral portion of the inner cylinder 3 opposed thereto are formed each by curves of the radii of curvature R1, R2 and R3.

In the state after being mounted as shown in the drawing, the outer cylinder 2 and the projecting portion 12 are moved toward the center C0 of the inner cylinder 3 in the direction of X, and each center C1 of the outer cylinder 2 and the projecting portion 12 is offset a little from the center C0 of the inner cylinder 3 and is positioned very close thereto. Therefore, on the X axis, each of intermediate points P and Q in the circumferential directions of the inner wall of the outer cylinder and of the tip 13 of the projecting portion 12 is located in the position remotest from an intermediate point S in the circumferential direction of the outer surface of the inner cylinder 3, so that the space "b" between the tip 13 of the projecting portion 12 and the outer peripheral surface of the inner cylinder 3 becomes maximum between the points Q and S, and is gradually decreased or narrowed toward the slit 10 located on the end in the circumferential direction. Also, in the direction of the Y axis, the space varies to be narrowed outward.

This space "b" varies according to the states before and after the mounting of the sub-frame mount 1, and also the widths of the slits 10 and 11 vary similarly. Namely, the slits 10 and 11 vary from an initial space w1 corresponding to the most opened initial slit width as shown in phantom line to the most narrowed slit width w2 after the mounting as shown in solid line.

Figure 5:
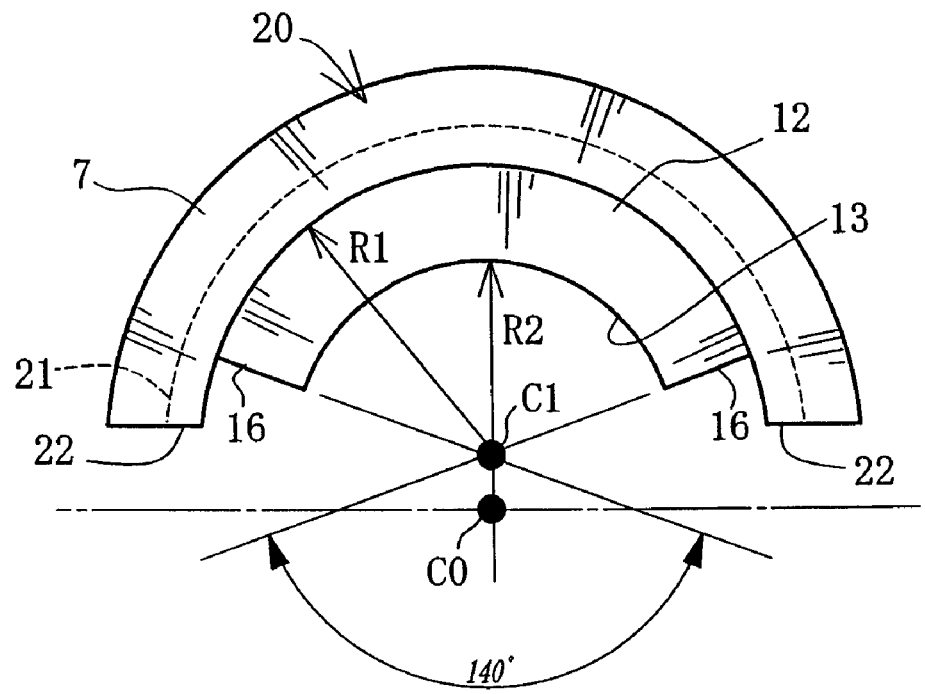
FIG. 5 is a plan view of a half body.
Figure 6:
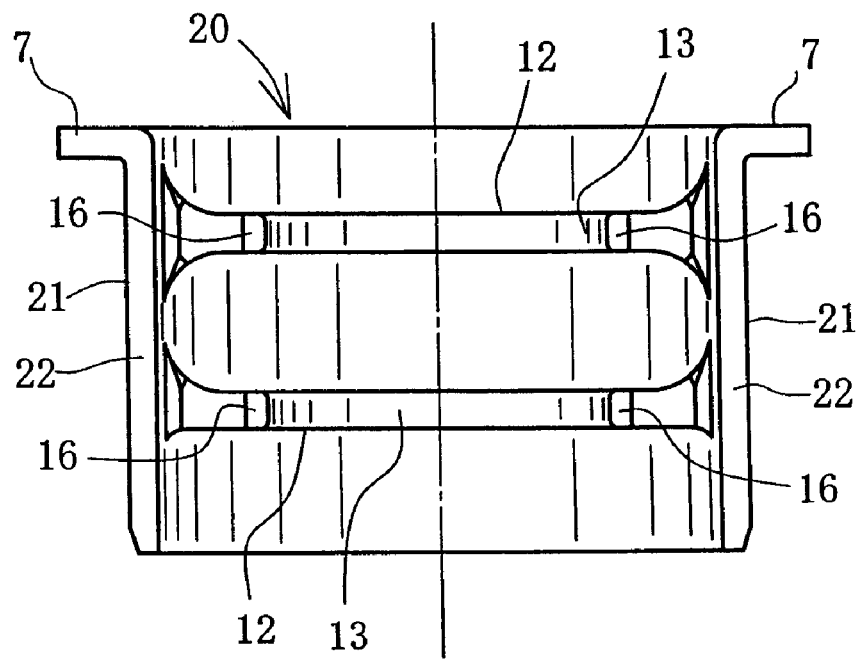
FIG. 6 is a view showing the inside of the half body.

FIG. 5 is a plan view showing one of the half bodies 20 of the outer cylinder 2 in the state of being turned 90 degrees around the Z axis from the state in FIG. 4, and FIG. 6 is a view showing the inner peripheral side thereof. The projecting portions 12 are formed in a step shape and provided in inwardly recessed positions from both ends in the axial direction of the half body 20 (see FIG. 6) and both circumferential ends 16 thereof stand back inwardly in the circumferential direction from both circumferential ends 22 of a substantially semicircular side wall 21 of the half body 20 (see FIG. 5), so as to be formed for example at an opening angle of 140 degrees. This opening angle can be optionally set according to the value of spring constant needed. The inner circumferential wall of the side wall 21 and the tip 13 of the projecting portion 12 are arranged concentrically in such a state that the radii from the center C1 are R1 and R2, respectively. Such half body 20 can be easily formed integral with the projecting portions 12 by a split mold (not shown) to be divided into the inner circumferential side and the outer circumferential side.

Figure 7:
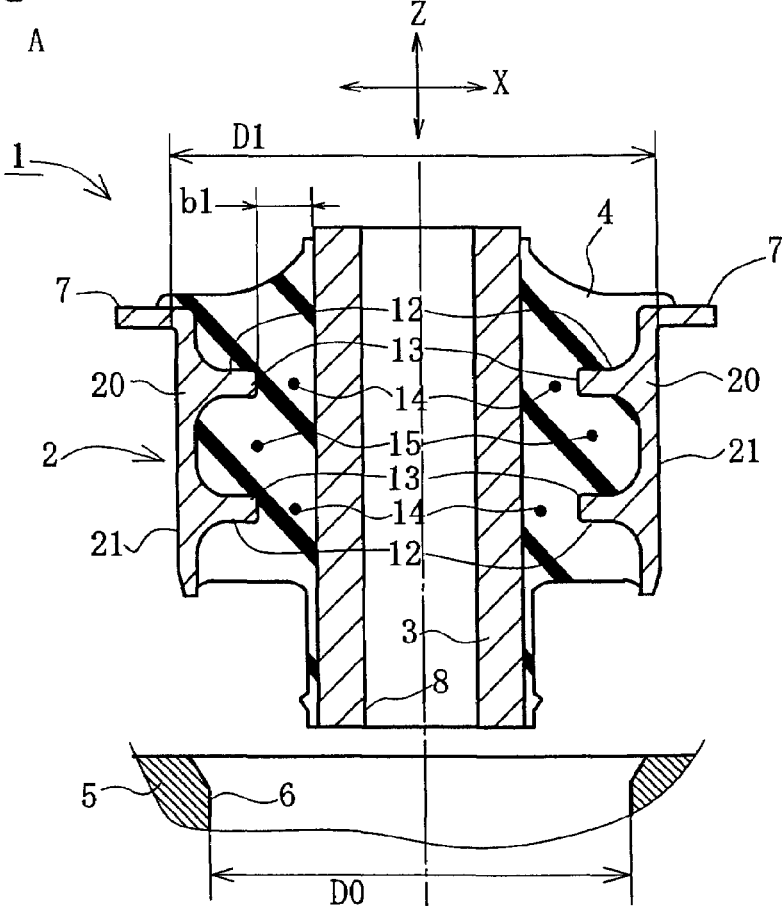
FIG. 7-A and FIG. 7-B are vertical sectional views showing the states before and after being mounted.
Figure 7:
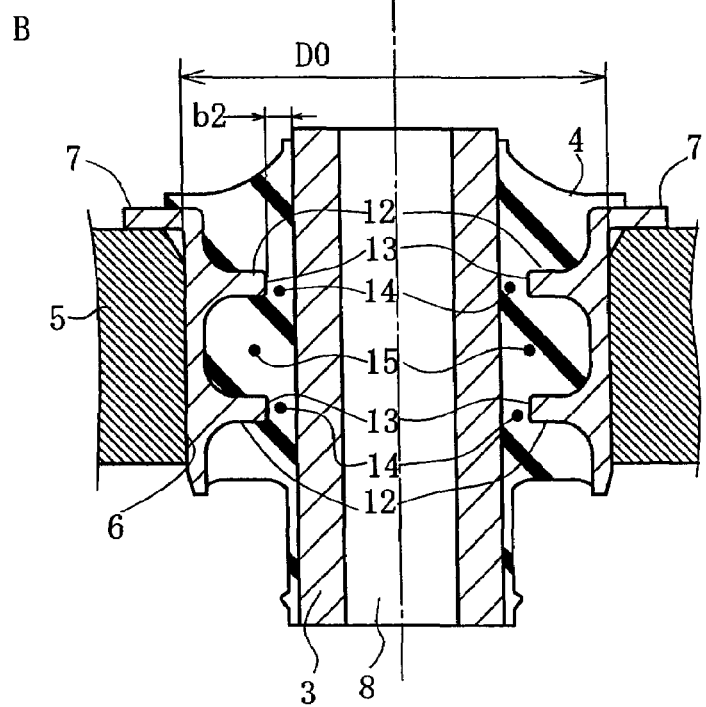

Next, the operation of this embodiment will be explained. FIG. 7 is a cross sectional view showing the state of mounting the sub-frame mount 1 on the sub-frame 5, wherein "A" is the state before being mounted and "B" is after being mounted. In FIG. 7-A, the outer cylinder 2 is in the state of the enlarged diameter D1 before being mounted and larger than an inner diameter D0 of the mounting hole 6 (D1>D0). Then, between the tip 13 and the inner cylinder 3 there is the space b1 before being mounted.

When the tip end of the outer cylinder 2 is fitted into the mounting hole 6 in this state and the sub-frame mount 1 is pressed into it, the outer cylinder 2 and the vibration isolating rubber 4 are pressed into the mounting hole 6 while having the slits 10 and 11 narrowed to reduce the outer diameter D1 to the inner diameter D0. Then, the side wall of the outer cylinder 2 is closely pressed and fixed through the repellent force of the vibration isolating rubber 4 to the periphery of the mounting hole 6 so as to become the mounted state as shown in FIG. 7-B.

In the mounted state of FIG. 7-B, the outer diameter after being mounted of the outer cylinder 2 corresponds with the inner diameter D0 of the mounting hole 6. Then, the space between the tip 13 and the inner cylinder 3 is narrowed to be the space b2 after being mounted, so that the compressed portions 14 are formed. The compressed portion 14 makes the spring constant in the direction of X larger through the vibration isolating rubber 4 which is compressed by a compression amount (b1−b2). Also, a portion of the vibration isolating rubber 4 is forced from the side of the inner cylinder 3 into the enclosed portion 13 between the pair of projecting portions 12 in the direction of Z so as to be compressed, whereby the spring constant in the direction of Z is increased by the compressed vibration isolating rubber 4.

Figure 8:
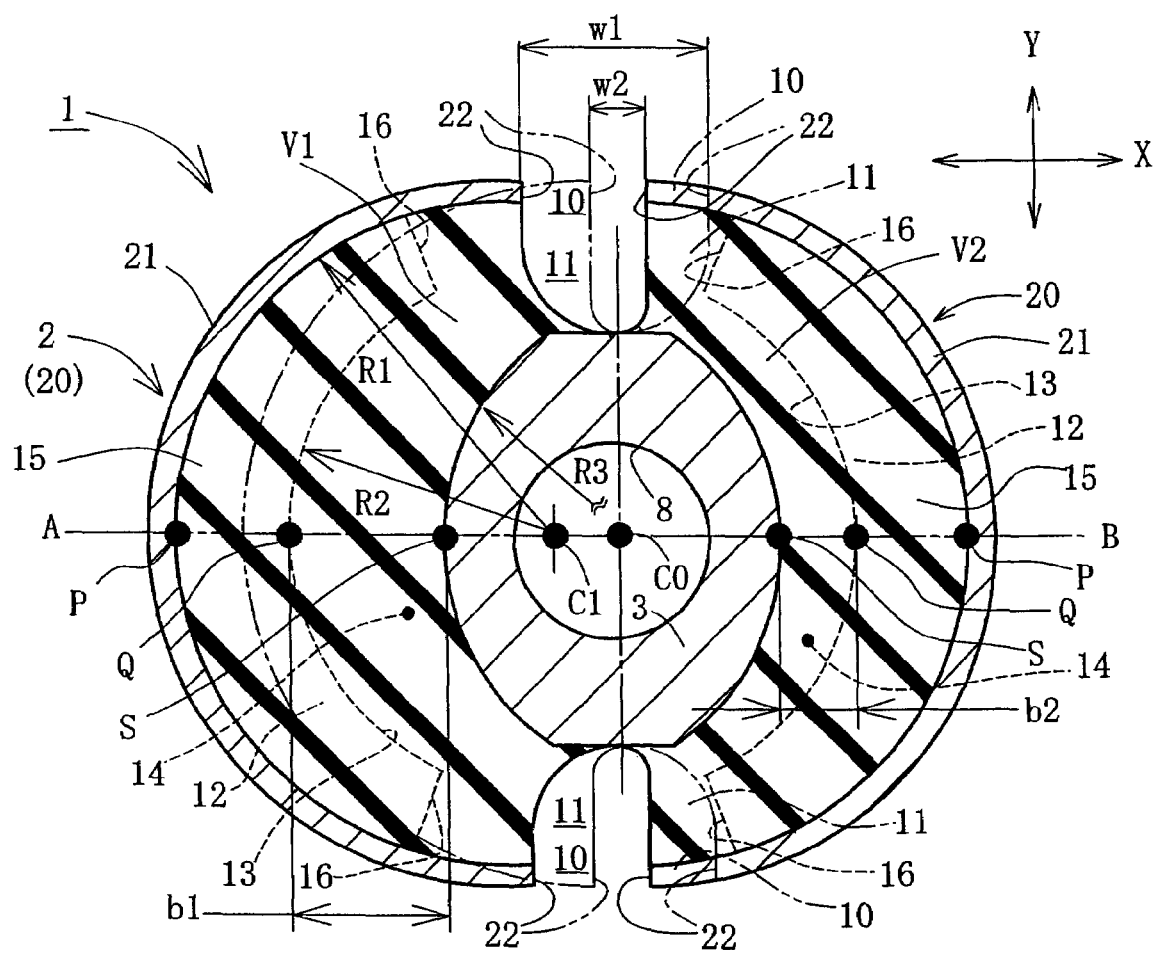
FIG. 8 is a transverse sectional view showing the states before and after being mounted.

FIG. 8 is a cross sectional view showing the states before and after being mounted, wherein the reference character "A" denotes the state before being mounted, on the left side of the drawing and the reference character "B" denotes the state after being mounted, on the right side of the drawing. As apparent from the drawing, before being mounted, the initial space b1 between the tip 13 of the projecting portion 12 of the outer cylinder 2 and the outer peripheral wall of the inner cylinder 3 is in an enlarged state, and the volume of the enclosed portion 15 varies from a large size V1 before compression to a small size V2 after compression.

This variation in volume is such a large scale as to be created by having the pair of half bodies 20 moved each in the central direction to narrow the space from each other while decreasing the width of the slit 10 from w1 to w2. Then, the vibration isolating rubber 4 corresponding to the decreased volume (V1−V2) is compressively held in the compressed portion 14 and the enclosed portion 15.

As shown on the left side of the drawing, in the initial state, each center C1 of the radii of curvature R1 and R2 of the outer cylinder 2 and the projecting portion 12 is positioned offset from the center C0 of the inner cylinder 3. Therefore, on the X axis, each of intermediate points P and Q in the circumferential directions of the inner wall of the outer cylinder and of the tip 13 of the projecting portion 12 is located in the position remotest from an intermediate point S in the circumferential direction of the outer surface of the inner cylinder 3, and the initial space "b1" before being mounted, between the tip 13 of the projecting portion 12 and the outer peripheral surface of the inner cylinder 3 is maximum between the points Q and S.

On the other hand, as shown on the right half side of the drawing, in the state after being compressed, each of the half bodies of the outer cylinder 2 has moved inwardly along the direction of the X axis so as to vary to such an extent that the center C1 of R1 is located substantially on the center C0 of the inner cylinder 3, whereby the space between the points Q and S is far decreased to be the space b2 after being mounted (b1>b2).

When the vibration isolating rubber 4 is compressed from the volume V1 to V2 in such a manner as above, the spring constant of the vibration isolating rubber 4 in the enclosed portion 15 is increased. In addition, the spring constant is determined by the volume of the vibration isolating rubber accommodated and compressed in the enclosed portion 15 and can be set independent of the compression amount of the compressed portion 14. Further, the displacement amount in the axial direction can be freely set by adjusting the space "a" between the pair of projecting portions 12 in the axial direction as shown in FIG. 3 so as to ensure the necessary stroke.

Also, since the spring constant in the direction of Z is easy to be more increased, it is possible to dispense with the stopper 4A projecting from the upper end surface of the vibration isolating rubber 4 in the direction of the Z axis (upwardly in the drawing), as shown in FIG. 3, whereby it is possible to be installed in the axially limited space. Thus, the whole device is shortened the dimensions in the axial direction so that it can be formed to be light and compact so as to increase the degree of freedom of layout. Also, the spring constant in the direction of Z and the spring constant in the direction of X each are able to be comparatively freely set thereby to increase the degree of freedom of the spring constant ratio control in the direction of Z and in the direction of X.

Moreover, the space between the inner wall of the outer cylinder 2 and the outer peripheral wall of the inner cylinder 3 is maximum between the intermediate portions P and S and is gradually narrowed toward the ends 16 in the circumferential direction of the projecting portion 12, and the portion in the vicinity of the inner cylinder 3 of the vibration isolating rubber 4 in the enclosed portion 15 is also narrowed from the upper and the lower sides by the tips 13 of the projecting portions 12. Therefore, the vibration isolating rubber 4 is difficult to escape to the periphery at the time of compression. Then, the vibration isolating rubber 4 is sent from the side of the slits 10 and 11 toward the intermediate portion (in the direction of the point Q in FIG. 8), and a larger amount of the vibration isolating rubber 4 is forced into the enclosed portion 15 so as to contribute to the formation of a larger spring constant.

In the state after being mounted, as shown in FIG. 3, when the load is inputted in the upward and downward direction, that is, in the direction of the Z axis, the enclosed portion 15 generates a large spring constant comprising mainly the shear. While the direction of the Z axis is the input direction of the principal load and essentially the large spring constant is required, it is possible to have the enclosed portion 15 filled with the large amount of compressed vibration isolating rubber 4 so as to form a sufficient spring constant. In addition, when the space "a" between the upper and lower projections 12 is set large enough, the large displacement in the direction of the Z axis can be performed.

On the other hand, the load inputted in the direction of the X axis is absorbed by the spring at the time of deformation, comprising mainly the compression of the compressed portion 14. At this time, the compressed portion 14 is previously compressed by the comparatively large amount of compression (b1−b2) whereby the spring constant can be set large enough. However, since the space b2 after being mounted is comparatively narrow, the amount of deformation permissible in the direction of X is small. Then, the load inputted in the direction of Y is controlled by the minimum spring constant (see FIG. 4).

Moreover, the magnitude of the spring constant can be freely varied each by adjusting the space "a" between the pair of projecting portions 12 in the direction of Z and by adjusting the space "b" between the tip 13 of the projecting portion 12 and the inner cylinder 3 in the direction of X. Consequently, the spring constant ratio between the spring constant in the direction of X and the spring constant in the direction of Z is easily controlled.

Also, as shown in FIG. 3 and FIG. 4, the outer cylinder 2 is split by the two slits 10 at 180 degree intervals so as to have the pair of half bodies 20 arranged opposite to each other in the direction of X, so that the spring constant in each of different directions of X, Y and Z can be easily set at the desired value in the three axial directions meeting at right angles.

Further, since the projecting portions 12 are formed integral with each of the half bodies 20 of the outer cylinder 2 provided in the split structure, they can be formed by the comparatively simple split mold for forming the outer peripheral surface and the inner peripheral surface of the half body 20 whereby the forming can be easily done. Also, since each of the right and left half bodies 20 is able to be used in common for the right and left halves, the number of the mold and the component parts can be decreased thereby to obtain cost reduction.

In addition, since the stopper 4A as in the prior art can be dispensed with, the micro-vibration is prevented from being transferred through the stopper 4A at the time of idling operation, so that the vibration isolating performance can be further improved.

Figure 9:
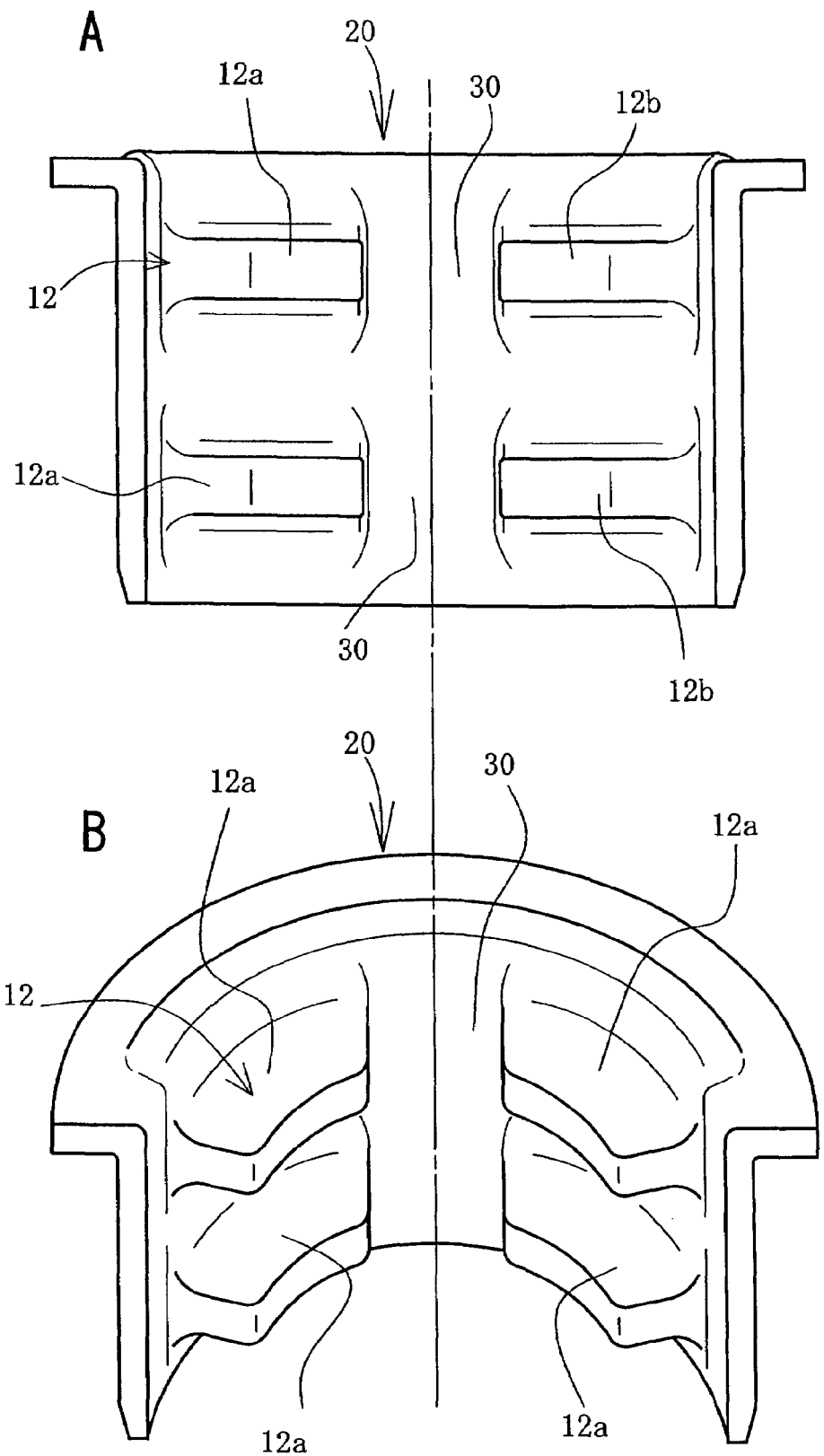
FIG. 9-A and FIG. 9-B are a front view and a perspective view of a half body according to the second embodiment of the present invention.

FIG. 9 shows the half body 20 according to another embodiment, wherein FIG. 9-A and FIG. 9-B are a front view and a perspective views of the half body, respectively. In this embodiment, a separation groove 30 is provided on an intermediate position of the projecting portions 12. The projecting portion 12 is divided into two separate steps 12a and 12b across the separation groove 30. The separation groove 30 is formed in the same position with respect to the upper and lower steps 12. The projecting portions 12 may be in a multiple step form of more than three steps. With this structure, the degree of freedom for setting the value of spring constant is increased, and the vibration isolating rubber 4 is easily forced into between the projecting portions 12.

Figure 10:
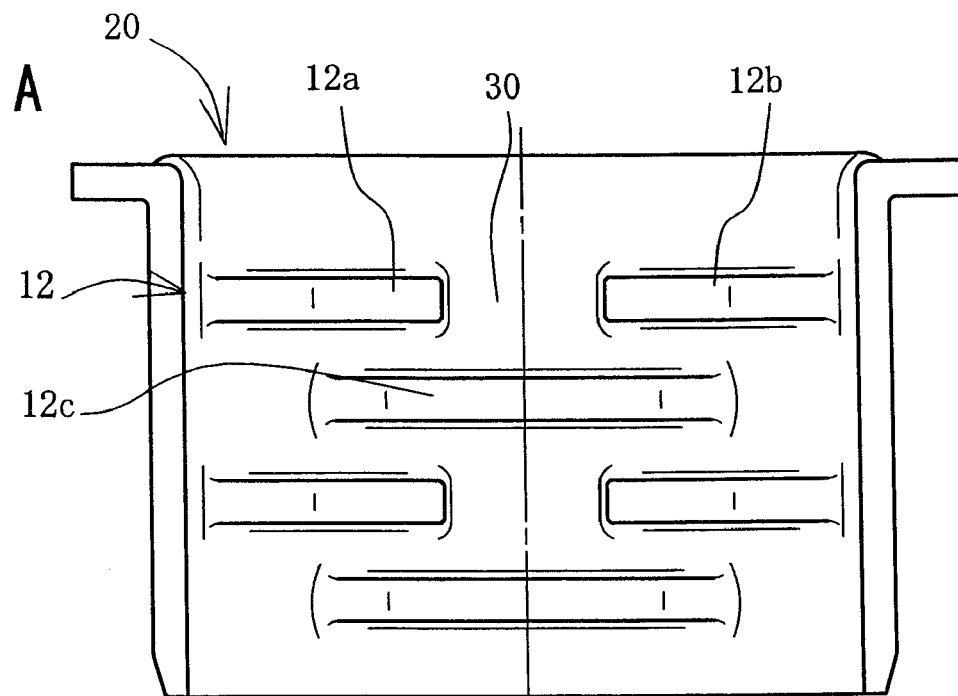
FIG. 10-A and FIG. 10-B are a front view and a perspective view of a half body according to the third embodiment of the present invention.
Figure 10:
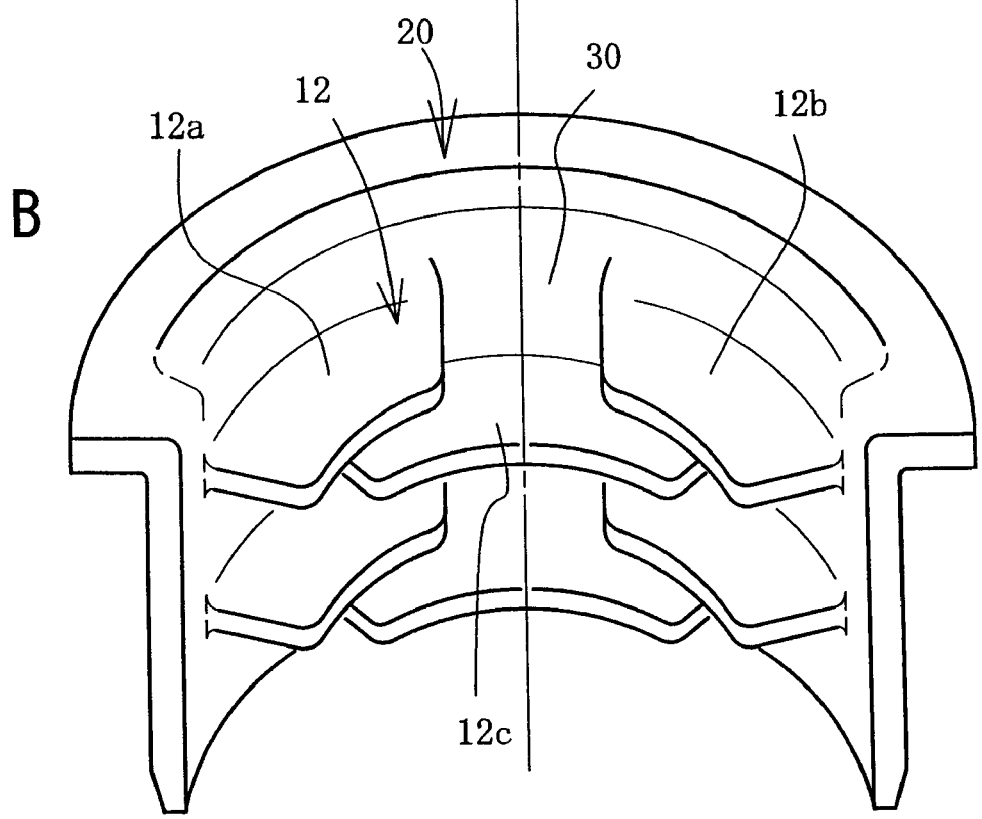

FIG. 10 shows a still another embodiment of FIG. 9, wherein FIG. 10-A is a front view and FIG. 10-B is a perspective view. The projecting portions 12 of a first step and a third step have the same structure as in FIG. 9. The projections 12 of a second step and a fourth step are formed into small steps 12c to close the area of a separation groove 30. The small step 12c is set to overlap about a half of the circumferential length of each of the separate steps 12a and 12b from the side of the separation groove 30. The overlapped degree of the small step 12c with each of the separate steps 12a, 12b and the number of the small step 12c are optional. With this structure, the degree of freedom for setting the value of spring constant is further increased, and the vibration isolating rubber 4 is easily forced into between the projecting portions 12.

It is to be understood that the present invention is not limited to the above described embodiments and that modifications and applications may be variously made within the scope and spirit of the invention. For example, the projecting portions 12 may be projected from the inner cylinder 3 to the outer cylinder 2 and may be projected alternately from the outer cylinder 2 and the inner cylinder 3. The division of the outer cylinder 2 is not limited to the division into two parts but the division into plural parts of not less than three parts may be made optionally. Then, the direction of the spring constant may be varied to the different direction of the spring by the number of division. In addition, the outer periphery of the inner cylinder 3 may be formed in a non-circular shape such as an ellipse or the like so as to vary the spring constant by making the curve of the portion opposite to the projecting portion 12 larger than that of the projecting portion 12. The projecting amount in the radial direction of the projecting portion 12 in the embodiment of FIG. 1 and in each of the embodiments of FIG. 9 and FIG. 10 may be varied each other. Further, the present invention may be applied to various kinds of publicly known cylindrical vibration isolating device such a suspension bushing, etc. besides the sub-frame mount.

What is claimed is:

1. A cylindrical vibration isolating device comprising:
   an inner cylinder having an outer peripheral wall;
   an outer cylinder arranged outside of the inner cylinder, said outer cylinder having a pair of projecting portions spaced apart by a predetermined distance in an axial direction and projecting from an inner peripheral wall of said outer cylinder towards said outer peripheral wall of said inner cylinder; and
   an elastic body having a compressed portion and being positioned between said inner cylinder and said outer cylinder,
   wherein, during mounting of the outer cylinder, said elastic body is compressed between said outer peripheral wall of said inner cylinder and said projecting portions thereby forming the compressed portion, and
   wherein said inner cylinder has said outer peripheral wall in which a radius of curvature of said outer peripheral wall of said inner cylinder is larger than a radius of curvature of said outer cylinder such that a space between said inner cylinder and said outer cylinder gradually narrows toward each end portion in a circumferential direction of said outer cylinder, and
   slits are provided at positions where the space between said outer peripheral wall of said inner cylinder and outer cylinder are narrowed.

2. The cylindrical vibration isolating device according to claim 1, wherein said outer cylinder comprises a pair of half bodies opposite to each other across the axis of said inner cylinder to reduce a diameter of the outer cylinder during mounting of the outer cylinder.

3. The cylindrical vibration isolating device according to claim 1, wherein said projecting portions are integrally formed with said outer cylinder.

4. The cylindrical vibration isolating device according to claim 2, wherein said projecting portions are integrally formed with said outer cylinder.

* * * * *